(12) United States Patent
Yamagishi

(10) Patent No.: US 7,047,835 B2
(45) Date of Patent: May 23, 2006

(54) ARTICULATED BENDING MECHANISM FOR LEGGED MOBILE ROBOT AND THE LEGGED MOBILE ROBOT

(75) Inventor: Takeshi Yamagishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 10/362,325

(22) PCT Filed: Jun. 21, 2002

(86) PCT No.: PCT/JP02/06197

§ 371 (c)(1),
(2), (4) Date: Jul. 15, 2003

(87) PCT Pub. No.: WO03/000471

PCT Pub. Date: Jan. 3, 2003

(65) Prior Publication Data

US 2004/0036438 A1    Feb. 26, 2004

(30) Foreign Application Priority Data

Jun. 22, 2001   (JP)   .............................. 2001-189764

(51) Int. Cl.
*B25J 5/00* (2006.01)
(52) U.S. Cl. ................. 74/490.03; 74/490.05; 446/353; 901/25; 901/15
(58) Field of Classification Search ................. 180/8.1, 180/8.6; 74/490.03, 490.05, 490.06; 901/19, 901/25, 27, 28, 15; 446/330, 352, 353
See application file for complete search history.

(56) References Cited

U.S. PATENT DOCUMENTS

| 4,234,150 | A | * | 11/1980 | Mee et al. | ............. | 248/281.11 |
| 4,862,980 | A | * | 9/1989 | Shkolnik | ..................... | 180/8.2 |
| 5,428,713 | A | * | 6/1995 | Matsumaru | .................. | 700/245 |
| 5,447,403 | A | * | 9/1995 | Engler, Jr. | ...................... | 414/4 |
| 5,456,568 | A | * | 10/1995 | Kirby et al. | ................. | 414/722 |
| 6,105,454 | A | * | 8/2000 | Bacchi et al. | ............ | 74/490.03 |
| 2005/0011296 | A1 | * | 1/2005 | Koseki | ..................... | 74/490.05 |

FOREIGN PATENT DOCUMENTS

| JP | 60114490 | A | * | 6/1985 |
| JP | 01240290 | A | * | 9/1989 |
| JP | 5-245784 | | | 9/1993 |
| JP | 07205066 | A | * | 8/1995 |
| JP | 2000237985 | A | * | 9/2000 |

\* cited by examiner

*Primary Examiner*—Kevin Hurley
(74) *Attorney, Agent, or Firm*—Frommer Lawrence & Haug LLP; William S. Frommer; Paul A. Levy

(57) ABSTRACT

An articulated bending mechanism is formed by connecting links which rotatably support a plurality of gears including input-side gears and output-side gears by engaging the gears. Each link rotatably supports an odd number of gears by engaging the gears, and an output-end gear rotates in the same direction as an input-end gear. The output-side gear of one link and the input-side gear of an adjacent link are used in common, and the rotating shaft of the common gear provides a degree of freedom provided at a joint of the articulated bending mechanism. Such an articulated bending mechanism can be formed with a small size and at a low cost, and can be used to imitate the way a living being shows its feelings and emotions.

22 Claims, 17 Drawing Sheets

ARTICULATED BENDING MECHANISM FOR LEGGED MOBILE ROBOT AND THE LEGGED MOBILE ROBOT

TECHNICAL FIELD

The present invention relates to an articulated robot comprising a plurality of joint actuators, and, more particularly, to a legged mobile robot using an ambulatory animal, such as a human being, an ape, or a dog, as a model.

Even more particularly, the present invention relates to a legged mobile robot comprising a bending portion that is formed by a plurality of joints, such as fingers, a tail, a neck, or a nose, and an articulated bending mechanism thereof. Still more particularly, the present invention relates to a legged mobile robot whose articulated bending mechanism is small and low in cost and which imitates the way a living being shows its emotions and feelings, and the articulated bending mechanism thereof.

BACKGROUND ART

A robot is a mechanical device which moves like a human being by making use of electrical and magnetic actions. The term "robot" is said to be derived from the Slavic word "ROBOTA" (slavish machine). In our country, the widespread use of robots began at the end of the 1960s, many of which were industrial robots, such as manipulators and conveyance robots, used, for example, for the purpose of achieving automatic industrial operations in factories without humans in attendance.

Installation-type robots, such as robots having arms, which are used by being implanted at a particular place, function only in fixed, limited working spaces for carrying out parts assembly/sorting or the like. In contrast, mobile robots can function in unlimited working spaces, so that they can freely move in predetermined paths or pathless areas in order to perform in place of human beings a predetermined or a desired human task, or to provide various wide-ranging services in place of living beings such as human beings or dogs. Of the mobile robots, legged mobile robots are unstable compared to crawler robots and robots with tires, so that it becomes difficult to control their posture and walking. However, legged mobile robots are excellent robots in that they can walk/run flexibly regardless of whether or not the ground is leveled, such as going up and down steps or a ladder or going over obstacles.

In recent years, advances have been made in the research and development of legged mobile robots such as humanoid robots which are designed using as a model the motion and mechanism of the body of an animal, such as a human being, which moves erect using two feet. There are increasing expectations for putting such robots into practical use. For example, Sony Corporation has presented a bipedal-walking humanoid robot "SDR-3X" on November 25.

Legged mobile robots may be used to help carry out or to carry out in place of human beings various difficult operations, such as in industrial tasks or production work. They carry out in place of human beings dangerous or difficult operations for human beings, such as maintenance work at nuclear power plants, thermal power plants, or petrochemical plants, parts transportation/assembly operations in manufacturing plants, cleaning in tall buildings, rescuing of people at places where there is a fire, etc.

Legged mobile robots may also be used for purposes closely related to life, such as for "living together" purposes or entertainment purposes, instead of helping human beings carry out a task. This type of robot imitates the way a living being fully shows its feelings and emotions using the four limbs or a movement mechanism of a legged walking animal which is relatively highly intelligent, such as a human being or a dog (pet). Legged mobile robots are required not only to faithfully execute a previously input behavior pattern, but also to respond vividly and dynamically to the words and behavior of, for example, a person (such as when praising, scolding, or hitting).

When legged mobile robots comprise, for example, uniform movable legs that are mounted to the left and right portions of the trunk, they can do the minimum work in the living space of human beings. In order for the legged mobile robots to function and behave in a more sophisticated manner, such as holding an object or handling a particular object in a working space, or making gestures or dancing using the upper half of the body, it is necessary to make the upper limbs move, and, desirably, to install an articulated bending mechanism for moving the finger tips even at the hands that are provided at the ends of the upper limbs.

A mechanism which can bend at a plurality of joints, such as the tail that many quadrupedal walking animals have, the neck of a giraffe, or the nose of an elephant, is very useful in making the robot imitate the way a living being shows its feelings and emotions.

However, in general, an articulated bending mechanism is designed and manufactured by disposing an actuator for every movable shaft. Therefore, for a member of a robot which is elongated like a finger and has very small intervals between links connecting each joint, the joint mechanism becomes large and complicated, so that the joint mechanism does not look like a finger.

An example of an elongated articulated mechanism is a bending mechanism used in, for example, an endoscope. However, this type of bending mechanism using a wire has difficulty generating a large driving force and is not suited for mass production because expensive structural members are used to assemble it.

DISCLOSURE OF INVENTION

It is an object of the present invention to provide an excellent legged mobile robot comprising a bending portion that is formed by a plurality of joints, such as fingers, a tail, a neck, or a nose; and an articulated bending mechanism thereof.

It is another object of the present invention to provide an excellent legged mobile robot whose articulated bending mechanism is small and low in cost and which can be used to imitate the way a living being shows its emotions and feelings; and the articulated bending mechanism.

In view of the above-described problems, according to a first aspect of the present invention, there is provided an articulated bending mechanism for a legged mobile robot having at least movable legs, which is formed by connecting links which rotatably support a plurality of gears including input-side gears and output-side gears by engaging the gears.

Here, the articulated bending mechanism may be constructed so that each link rotatably supports an odd number of gears by engaging the gears, and an output-end gear rotates in the same direction as an input-end gear.

The articulated bending mechanism may be constructed so that the output-side gear of one link and the input-side gear of an adjacent link are used in common, and the rotating shaft of the common gear provides a degree of freedom provided at a joint of the articulated bending mechanism.

The articulated bending mechanism may further comprise a drive section for applying rotational force to the input-side gear at a bottommost link, wherein, as the rotational force is applied by the drive section, bending occurs at a joint between each link in a certain direction.

Therefore, the articulated bending mechanism of the first aspect of the present invention easily generates a large driving force compared to a bending mechanism using a wire. In addition, since the articulated bending mechanism of the first aspect of the present invention can be assembled using only inexpensive structural members, it is possible to achieve mass production. Further, by forming the articulated bending mechanism small and at a low cost, it can be used in the legged mobile robot to imitate the way a living being shows its feelings and emotions.

The drive section may have a clutch mechanism for allowing the input-side gear of the bottommost link to rotate freely by disengaging the rotating shaft when a rotational opposing force equal to or greater than a predetermined value is applied to the drive section from the input-side gear of the bottommost link. Therefore, even if an abnormal opposing force is exerted upon the articulated bending mechanism, by allowing free rotation of the gear, the opposing force is not transmitted to a motor, thereby making it possible to prevent breakage of the device.

The articulated bending mechanism may further comprise an end portion which engages the output-side gear of the link at a frontmost end in order to prevent idle rotation of the gears supported by the respective links, so that bending at a joint between each link in a certain direction as each gear rotates is ensured.

The articulated bending mechanism may be constructed so that each link has a restricting section which, in order to prevent rotation in a reverse direction at a joint between adjacent links, comes into contact with its adjacent link in a predetermined rotating position at the joint for restricting rotation.

The articulated bending mechanism according to the first aspect of the present invention may be used as, for example, fingers of the legged mobile robot. In such a case, the sizes of the links or the distances between joints of the fingers are adjusted according to the number of gears accommodated in each link.

In other words, when the fingers of the hands are formed using the articulated bending mechanism, it is not necessary to dispose an actuator for each movable shaft, so that members like the fingers which are elongated and which have very small intervals between links connecting each joint can be designed and manufactured with small sizes.

The articulated bending mechanism of the first aspect of the present invention easily generates a large driving force compared to a bending mechanism using a wire. In addition, since the articulated bending mechanism of the first aspect of the present invention can be assembled using only inexpensive structural members, it is possible to achieve mass production.

The articulated bending mechanism of the first aspect of the present invention may be used as a neck of the legged mobile robot.

More specifically, when the neck of a giraffe is formed using the articulated bending mechanism, it is not necessary to dispose an actuator for each movable shaft, and a member which is elongated like the neck of a giraffe and which has very small intervals between the links connecting each joint can be designed and manufactured with a small size. In addition, compared to the case where a bending mechanism using a wire is used, a large driving force can be easily generated. Further, since the articulated bending mechanism of the first aspect of the present invention can be assembled using only inexpensive structural members, it is possible to achieve mass production.

The articulated bending mechanism of the first aspect of the present invention may be used as a nose of the legged mobile robot.

More specifically, when the nose of an elephant is formed using the articulated bending mechanism, it is not necessary to dispose an actuator for each movable shaft, and a member which is elongated like the nose of an elephant and which has very small intervals between the links connecting each joint can be designed and manufactured with a small size. In addition, compared to the case where a bending mechanism using a wire is used, a large driving force can be easily generated. Further, since the articulated bending mechanism of the first aspect of the present invention can be assembled using only inexpensive structural members, it is possible to achieve mass production.

The articulated bending mechanism of the first aspect of the present invention may be used as a tail of the legged mobile robot.

More specifically, when the tail of a lizard is formed using the articulated bending mechanism, it is not necessary to dispose an actuator for each movable shaft, and a member which is elongated like the tail of a lizard and which has very small intervals between the links connecting each joint can be designed and manufactured with a small size. In addition, compared to the case where a bending mechanism using a wire is used, a large driving force can be easily generated. Further, since the articulated bending mechanism of the first aspect of the present invention can be assembled using only inexpensive structural members, it is possible to achieve mass production.

According to a second aspect of the present invention, there is provided a legged mobile robot having at least movable legs, which comprises an articulated bending mechanism which is formed by connecting links which rotatably support a plurality of gears including input-side gears and output-side gears by engaging the gears.

The legged mobile robot may be constructed so that each link of the articulated bending mechanism rotatably supports an odd number of gears by engaging the gears, and an output-end gear rotates in the same direction as an input-end gear.

The legged mobile robot may be constructed so that the output-side gear of one link and the input-side gear of an adjacent link are used in common, and the rotating shaft of the common gear provides a degree of freedom provided at a joint of the articulated bending mechanism.

The legged mobile robot may further comprise a drive section for applying rotational force to the input-side gear at a bottommost link, wherein the articulated bending mechanism is constructed so that, as the rotational force is applied by the drive section, bending occurs at a joint between each link.

Therefore, the articulated bending mechanism used in the legged mobile robot of the second aspect of the present invention easily generates a large driving force compared to a bending mechanism using a wire. In addition, since the articulated bending mechanism of the present invention can be assembled using only inexpensive structural members, it is possible to achieve mass production. Further, by forming the articulated bending mechanism small and at a low cost, it can be used in the legged mobile robot to imitate the way a living being shows its feelings and emotions.

The drive section may have a clutch mechanism for allowing the input-side gear of the bottommost link to rotate freely by disengaging the rotating shaft when a rotational opposing force equal to or greater than a predetermined value is applied to the drive section from the input-side gear of the bottommost link. Therefore, even if an abnormal opposing force is exerted upon the articulated bending mechanism, by allowing free rotation of the gear, the opposing force is not transmitted to a motor, thereby making it possible to prevent breakage of the device.

The articulated bending mechanism of the present invention may further comprise an end portion which engages the output-side gear of the link at a frontmost end in order to prevent idle rotation of the gears supported by the respective links, so that bending at a joint between each link in a certain direction as each gear rotates is ensured.

Each link may have a restricting section which, in order to prevent rotation in a reverse direction at a joint between adjacent links, comes into contact with its adjacent link in a predetermined rotating position at the joint for restricting rotation.

In the legged mobile robot of the second aspect of the present invention, the articulated bending mechanism may be used as, for example, fingers. In such a case, the sizes of the links or the distances between joints of the fingers are adjusted according to the number of gears accommodated in each link. In other words, when the fingers of the hands are formed using the articulated bending mechanism, it is not necessary to dispose an actuator for each movable shaft, so that members which are elongated like the fingers and which have very small intervals between links connecting each joint can be designed and manufactured with small sizes.

In the legged mobile robot of the second aspect of the present invention, the articulated bending mechanism may be used as a neck. More specifically, when the neck of a giraffe is formed using the articulated bending mechanism, it is not necessary to dispose an actuator for each movable shaft, and a member which is elongated like the neck of a giraffe and which has very small intervals between the links connecting each joint can be designed and manufactured with a small size.

In the legged mobile robot of the second aspect of the present invention, the articulated bending mechanism may be used as a nose. More specifically, when the nose of an elephant is formed using the articulated bending mechanism, it is not necessary to dispose an actuator for each movable shaft, and a member which is elongated like the nose of an elephant and which has very small intervals between the links connecting each joint can be designed and manufactured with a small size.

In the legged mobile robot of the second aspect of the present invention, the articulated bending mechanism may be used as a tail. More specifically, when the tail of a lizard is formed using the articulated bending mechanism, it is not necessary to dispose an actuator for each movable shaft, and a member which is elongated like the tail of a lizard and which has very small intervals between the links connecting each joint can be designed and manufactured with a small size.

Further objects, features and advantages of the present invention will become apparent from the following description of a preferred embodiment with reference to the attached drawings.

BEST MODE FOR CARRYING OUT THE INVENTION

Hereunder, a description of an embodiment of the present invention will be given in detail with reference to the drawings.

Figure 1:
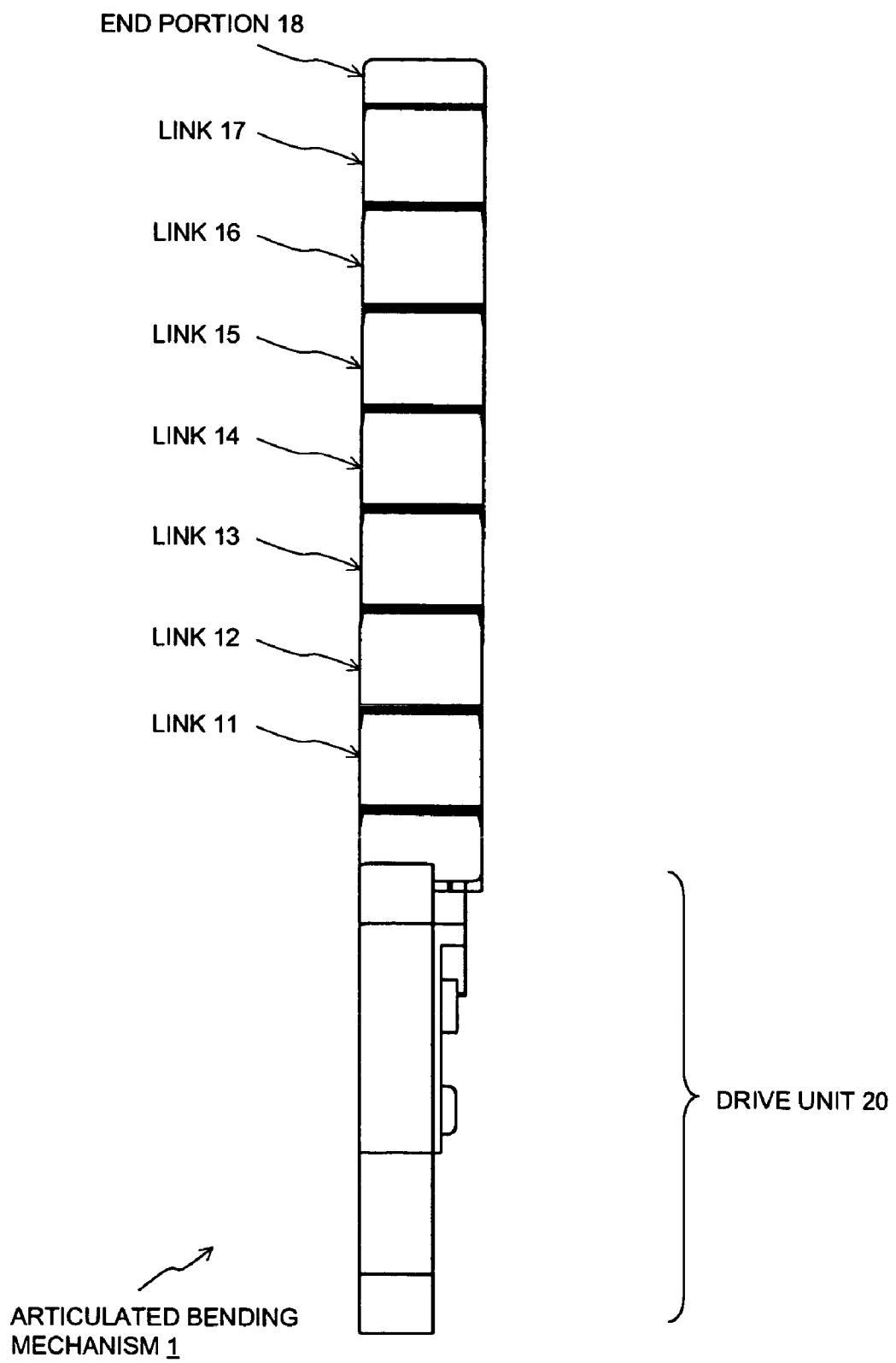
FIG. 1 is a front view showing a state in which an articulated bending mechanism 1 of an embodiment of the present invention is extended substantially in a straight line.
Figure 2:
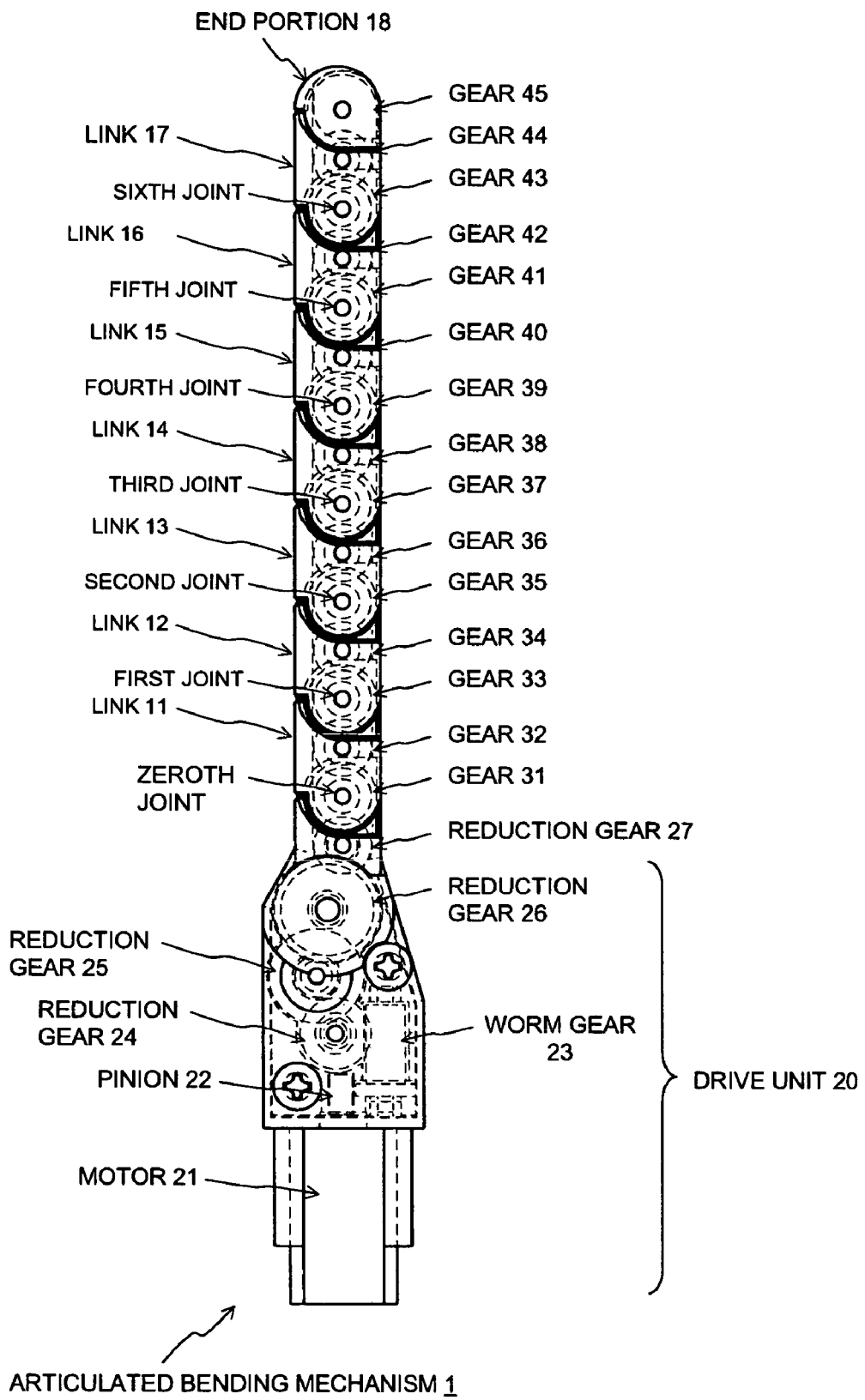
FIG. 2 is a side view showing the state in which the articulated bending mechanism 1 of the embodiment of the present invention is extended substantially in a straight line.
Figure 3:
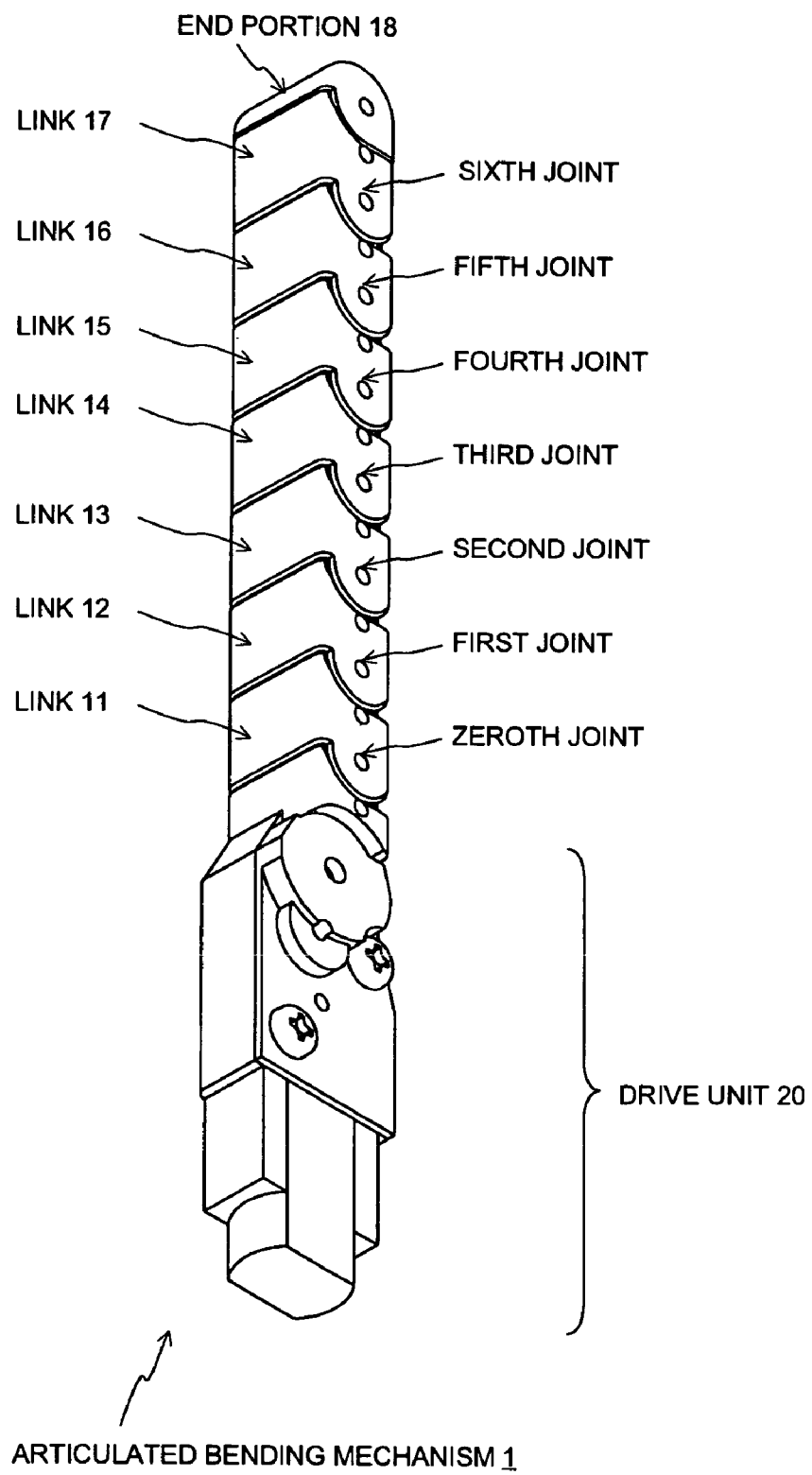
FIG. 3 is a perspective view showing the state in which the articulated bending mechanism 1 of the embodiment of the present invention is extended substantially in a straight line.
Figure 4:
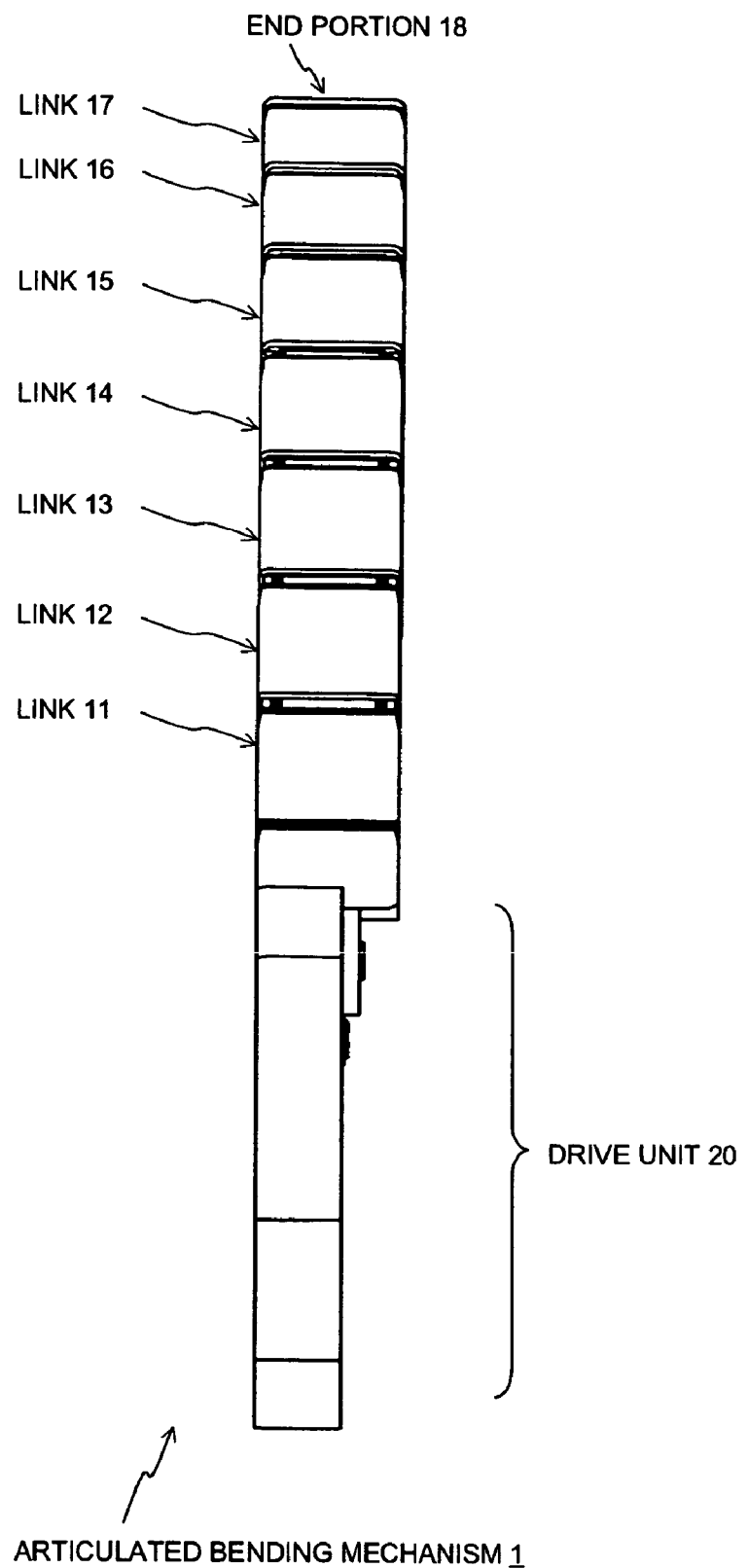
FIG. 4 is a front view showing a state in which the articulated bending mechanism 1 of the embodiment of the present invention is bent.
Figure 5:
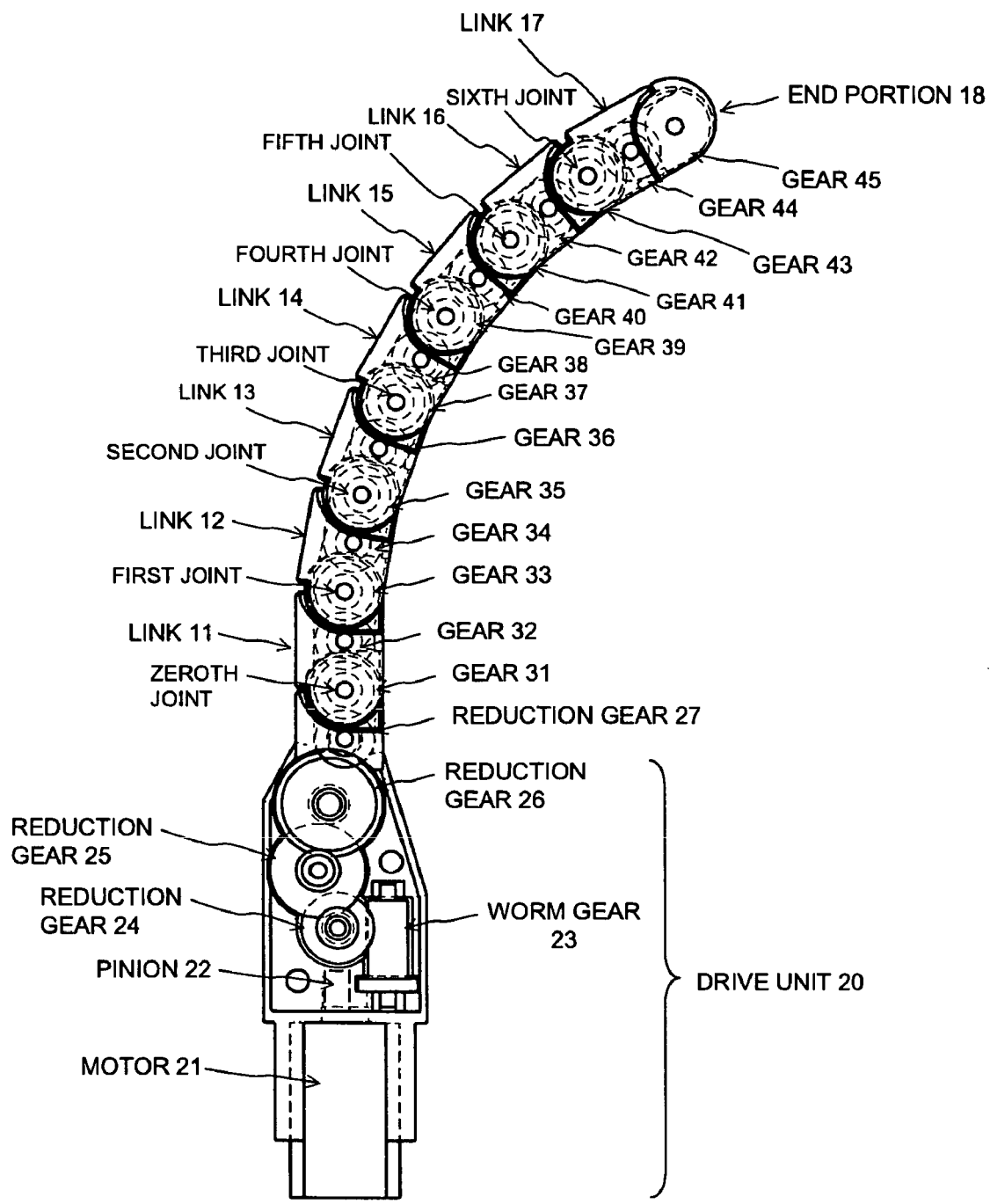
FIG. 5 is a side view showing the state in which the articulated bending mechanism 1 of the embodiment of the present invention is bent.
Figure 6:
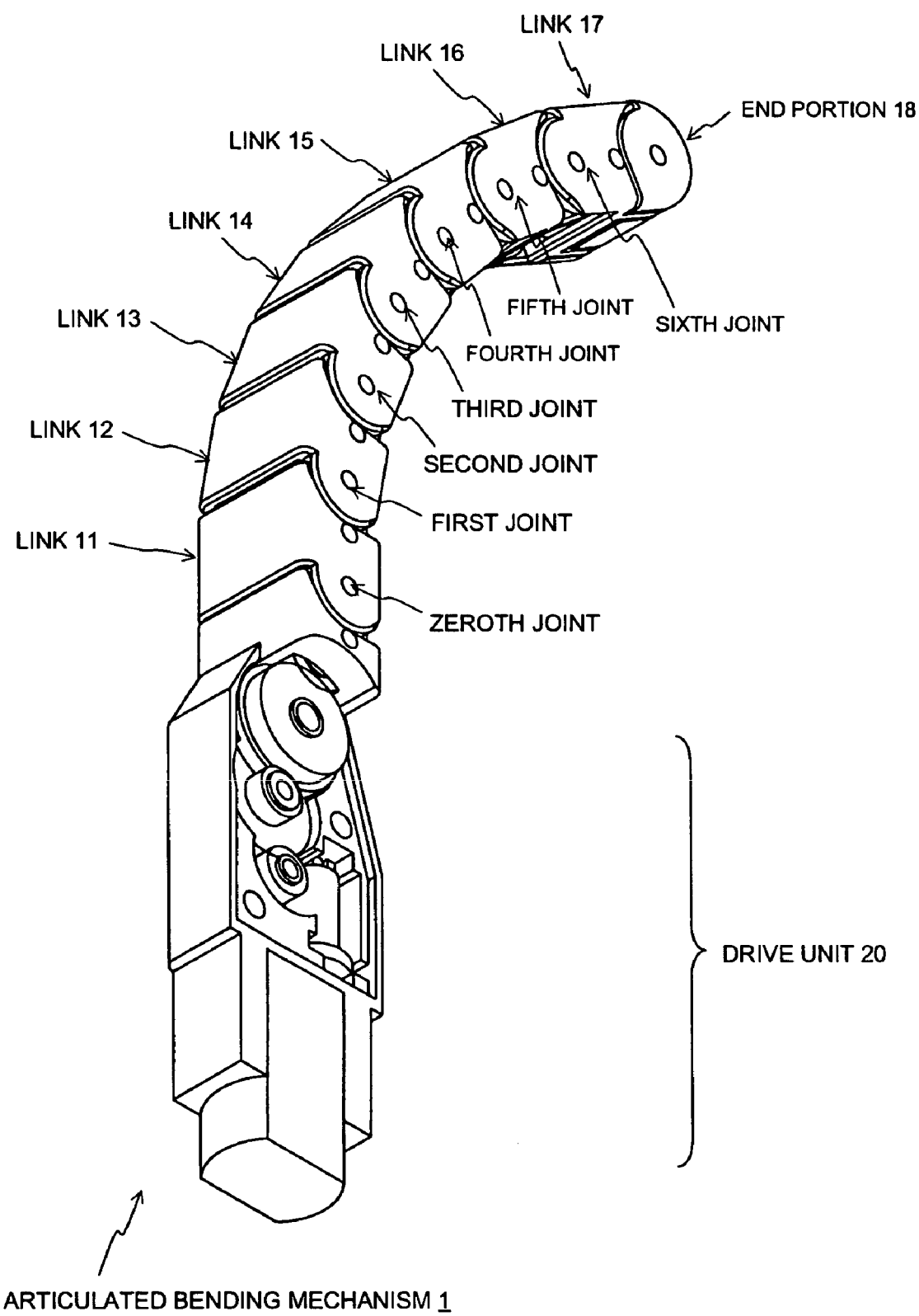
FIG. 6 is a perspective view showing the state in which the articulated bending mechanism 1 of the embodiment of the present invention is bent.

FIGS. 1, 2, and 3 are a front view, a side view, and a perspective view, respectively, showing a state in which an articulated bending mechanism 1 of an embodiment of the present invention is extended substantially in a straight line. Similarly, FIGS. 4, 5, and 6 are a front view, a side view, and a perspective view, respectively, showing a state in which the articulated bending mechanism 1 is bent.

As shown in each figure, the articulated bending mechanism 1 comprises seven links 11 to 17, which are linked in series, and an end portion 18, which is linked to the terminal end of the linked links. A drive unit 20 for providing driving force for bending and extending the articulated bending mechanism 1 to the articulated bending mechanism 1 is mounted to the other end of the linked links.

The drive unit 20 comprises a motor 21 for producing rotational motion by an electromagnetic action, a pinion 22 integrally mounted to the rotating shaft of the motor 21, a worm gear 23 which engages the pinion 22 to change the direction of the rotating shaft to an orthogonal direction, and four gears 24 to 27 which transmit rotational force from the worm gear 23 to the articulated bending mechanism 1 while reducing the speed at a predetermined speed reduction ratio.

The links 11 to 17 of the articulated bending mechanism 1 each rotatably accommodate three or an odd number of gears. Adjacent gears engage each other. By transmitting the rotational force by the odd number of gears, the directions of rotation of an input-side gear and an output-side gear can be made the same. By using the input-side gear of one link as the output-side gear of an adjacent link, a joint having the degrees of freedom that is provided around the rotating shaft of the gear that is used in common is formed.

The link 11 rotatably supports three gears 31, 32, and 33 in series. By engaging the gear 31, disposed at one end, with the output gear 27 of the drive unit 20, rotational driving force is input to the gear 31. The rotating shaft of the gear 31 forms the zeroth joint of the articulated bending mechanism 1. The rotational driving force is transmitted to the gear 32 engaging the gear 31 in order to transmit rotational force acting in the same direction to the gear 33.

The link 12 rotatably supports three gears, the gear 33 and gears 34 and 35, in series. The gear 33, disposed at one end, is used in common by the adjacent link 11. The rotating shaft of the gear 33 forms the first joint of the articulated bending mechanism 1. The rotational force applied to the gear 33 is transmitted to the gear 34 engaging the gear 33 in order to transmit rotational force acting in the same direction to the gear 35.

The link 13 rotatably supports three gears, the gear 35 and gears 36 and 37, in series. The gear 35, disposed at one end, is used in common by the adjacent link 12. The rotating shaft of the gear 35 forms the second joint of the articulated bending mechanism 1. The rotational force applied to the gear 35 is transmitted to the gear 36 engaging the gear 35 in order to transmit rotational force acting in the same direction to the gear 37.

The link 14 rotatably supports three gears, the gear 37 and gears 38 and 39, in series. The gear 37, disposed at one end, is used in common by the adjacent link 13. The rotating shaft of the gear 37 forms the third joint of the articulated bending mechanism 1. The rotational force applied to the gear 37 is transmitted to the gear 38 engaging the gear 37 in order to transmit rotational force acting in the same direction to the gear 39.

The link 15 rotatably supports three gears, the gear 39 and gears 40 and 41, in series. The gear 39, disposed at one end, is used in common by the adjacent link 14. The rotating shaft of the gear 39 forms the fourth joint of the articulated bending mechanism 1. The rotational force applied to the gear 39 is transmitted to the gear 40 engaging the gear 39 in order to transmit rotational force acting in the same direction to the gear 41.

The link 16 rotatably supports three gears, the gear 41 and gears 42 and 43, in series. The gear 41, disposed at one end, is used in common by the adjacent link 15. The rotating shaft of the gear 41 forms the fifth joint of the articulated bending mechanism 1. The rotational force applied to the gear 41 is transmitted to the gear 42 engaging the gear 41 in order to transmit rotational force acting in the same direction to the gear 43.

The link 17 rotatably supports three gears, the gear 43 and gears 44 and 45, in series. The gear 43, disposed at one end, is used in common by the adjacent link 16. The rotating shaft of the gear 43 forms the sixth joint of the articulated bending mechanism 1. The rotational force applied to the gear 43 is transmitted to the gear 44 engaging the gear 43 in order to transmit rotational force acting in the same direction to the gear 45.

The end portion 18 is mounted to the other end of the link 17. As described later, a toothed portion 18A engaging the terminal gear 45 is formed at the inner wall of the end portion 18. Therefore, by terminating the output-side gear 45 of the link 17 by engaging it with the toothed portion 18A of the end portion 18, it is possible to apply the rotational force which is applied to the fifteen gears 31 to 45 to the respective links 11 to 17 without idle rotation of the gears 31 to 45 around respective rotating shafts 31A to 45A.

For example, in the link 11, as shown in FIG. 5, when rotational force acting in a clockwise direction with respect to the plane of the figure applied to the gear 31 is transmitted to the gear 33 through the gear 32, the gears 31 to 33 do not end up rotating idly. Instead, a force which rotates the link 11 clockwise in the plane of the figure at the first joint defined by the rotating shaft of the gear 31 is generated.

In the link 12, as shown in FIG. 5, when rotational force acting in a clockwise direction with respect to the plane of the figure applied to the gear 33 is transmitted to the gear 35 through the gear 34, the gears 33 to 35 do not end up rotating idly. Instead, a force which rotates the link 12 clockwise in the plane of the figure at the second joint defined by the rotating shaft of the gear 33 is generated.

In the link 13, as shown in FIG. 5, when rotational force acting in a clockwise direction with respect to the plane of the figure applied to the gear 35 is transmitted to the gear 37 through the gear 36, the gears 35 to 37 do not end up rotating idly. Instead, a force which rotates the link 13 clockwise in the plane of the figure at the third joint defined by the rotating shaft of the gear 35 is generated.

In the link 14, as shown in FIG. 5, when rotational force acting in a clockwise direction with respect to the plane of the figure applied to the gear 37 is transmitted to the gear 39 through the gear 38, the gears 37 to 39 do not end up rotating idly. Instead, a force which rotates the link 14 clockwise in the plane of the figure at the fourth joint defined by the rotating shaft of the gear 37 is generated.

In the link 15, as shown in FIG. 5, when rotational force acting in a clockwise direction with respect to the plane of the figure applied to the gear 39 is transmitted to the gear 41 through the gear 40, the gears 39 to 41 do not end up rotating idly. Instead, a force which rotates the link 15 clockwise in the plane of the figure at the fifth joint defined by the rotating shaft of the gear 39 is generated.

In the link 16, as shown in FIG. 5, when rotational force acting in a clockwise direction with respect to the plane of the figure applied to the gear 41 is transmitted to the gear 43 through the gear 42, the gears 41 to 43 do not end up rotating idly. Instead, a force which rotates the link 16 clockwise in the plane of the figure at the sixth joint defined by the rotating shaft of the gear 41 is generated.

In the link 17, as shown in FIG. 5, when rotational force acting in a clockwise direction with respect to the plane of the figure applied to the gear 43 is transmitted to the gear 45 through the gear 44, the gears 43 to 45 do not end up rotating idly. Instead, a force which rotates the link 17 clockwise in the plane of the figure at the seventh joint defined by the rotating shaft of the gear 43 is generated.

A clutch mechanism for disengaging the rotating shaft when a rotational opposing force equal to or greater than a predetermined value is applied to the output-end gear 27 of the drive unit 20 is incorporated in the output-end gear 27. Therefore, even if an abnormal opposing force is applied to the articulated bending mechanism 1, it is possible to prevent breakage of the device because the opposing force is not transmitted to the motor 21 due to disengagement of the gear 27. In this case, in the articulated bending mechanism 1, the first joint defined by the rotating shaft of the gear 31 is disengaged.

Figure 7:
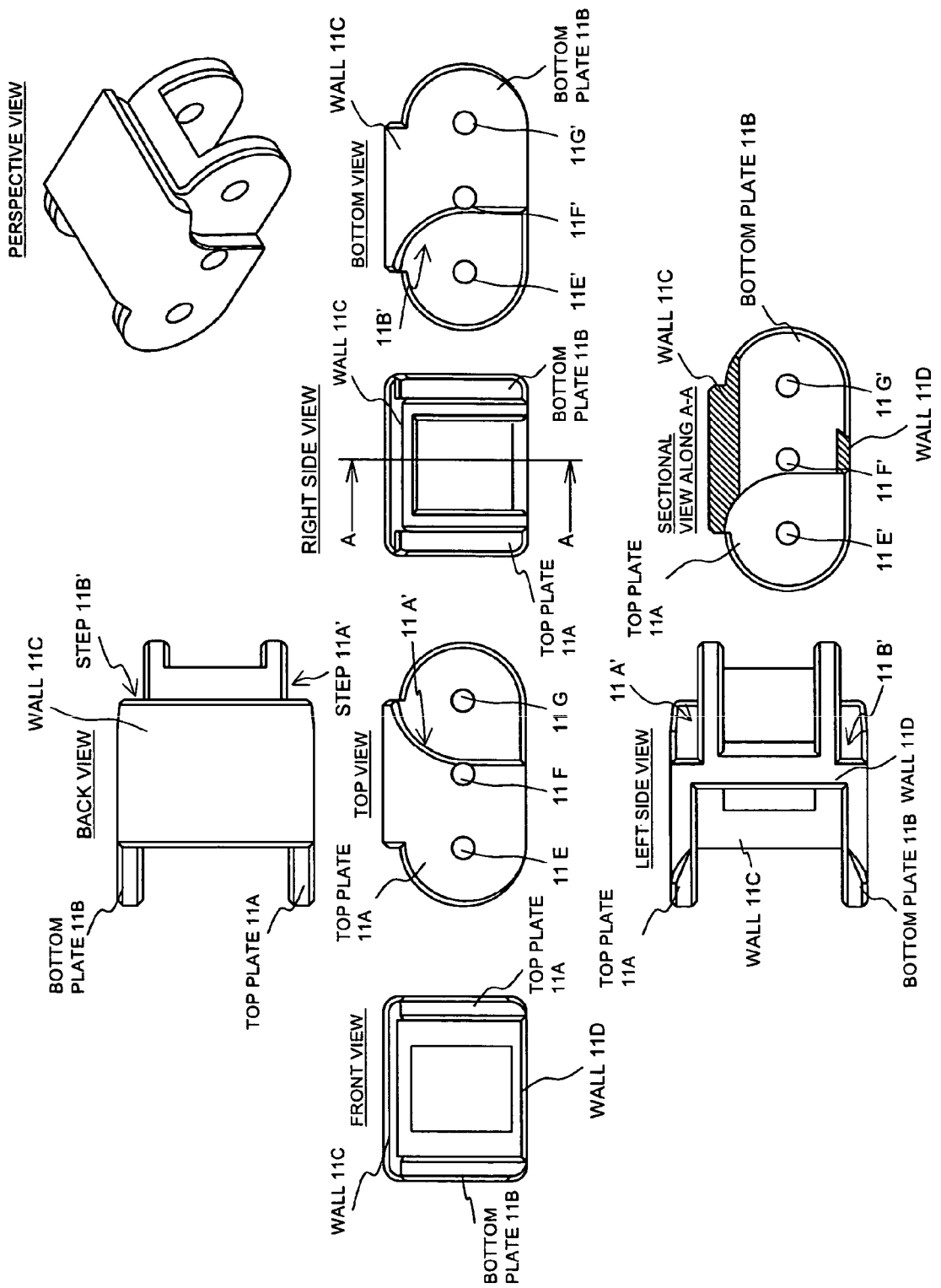
FIG. 7 shows a link 11 in six side views, in sectional view, and in perspective view.
Figure 8:
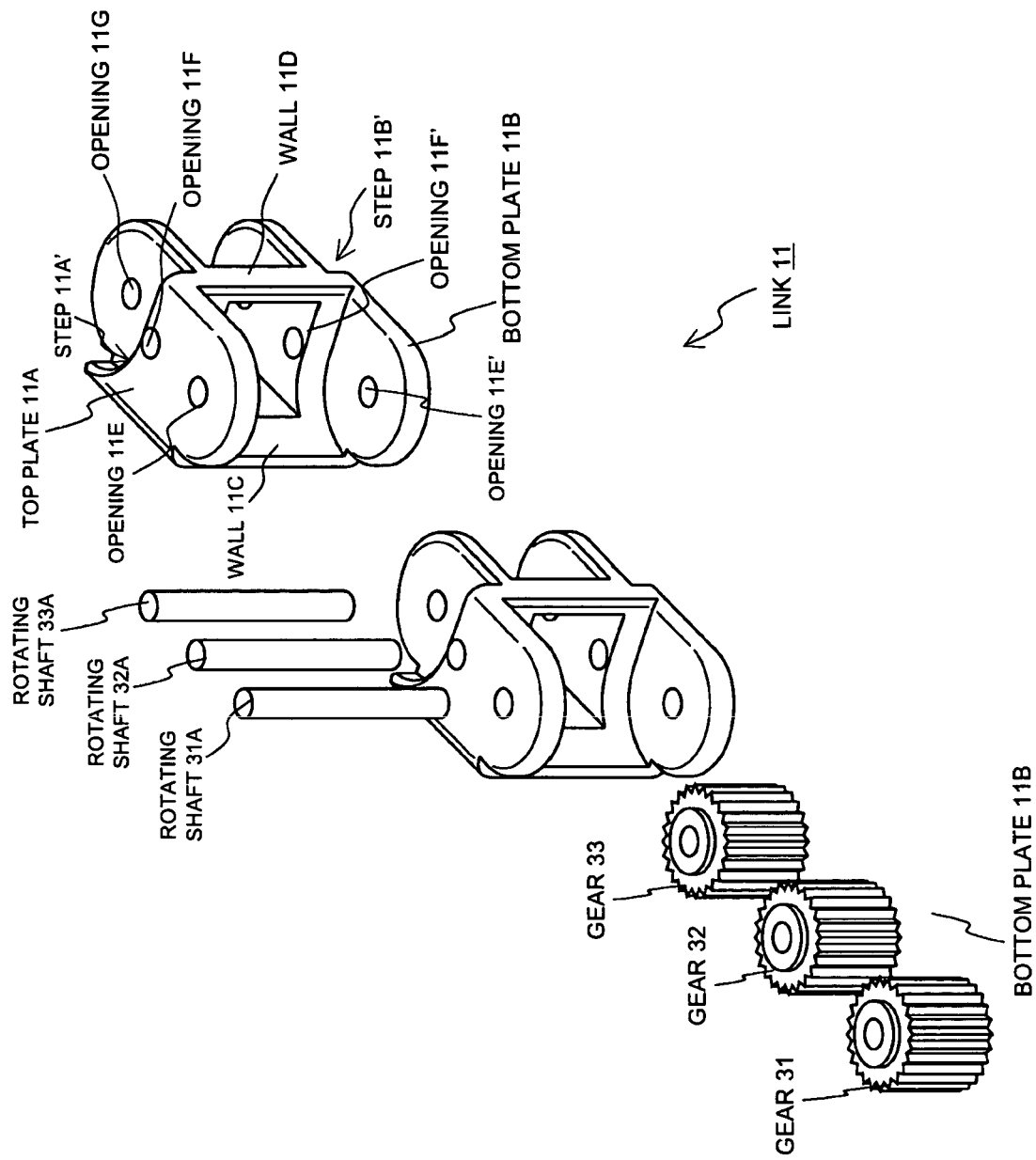
FIG. 8 is an exploded view of the parts of the link 11.
Figure 9:
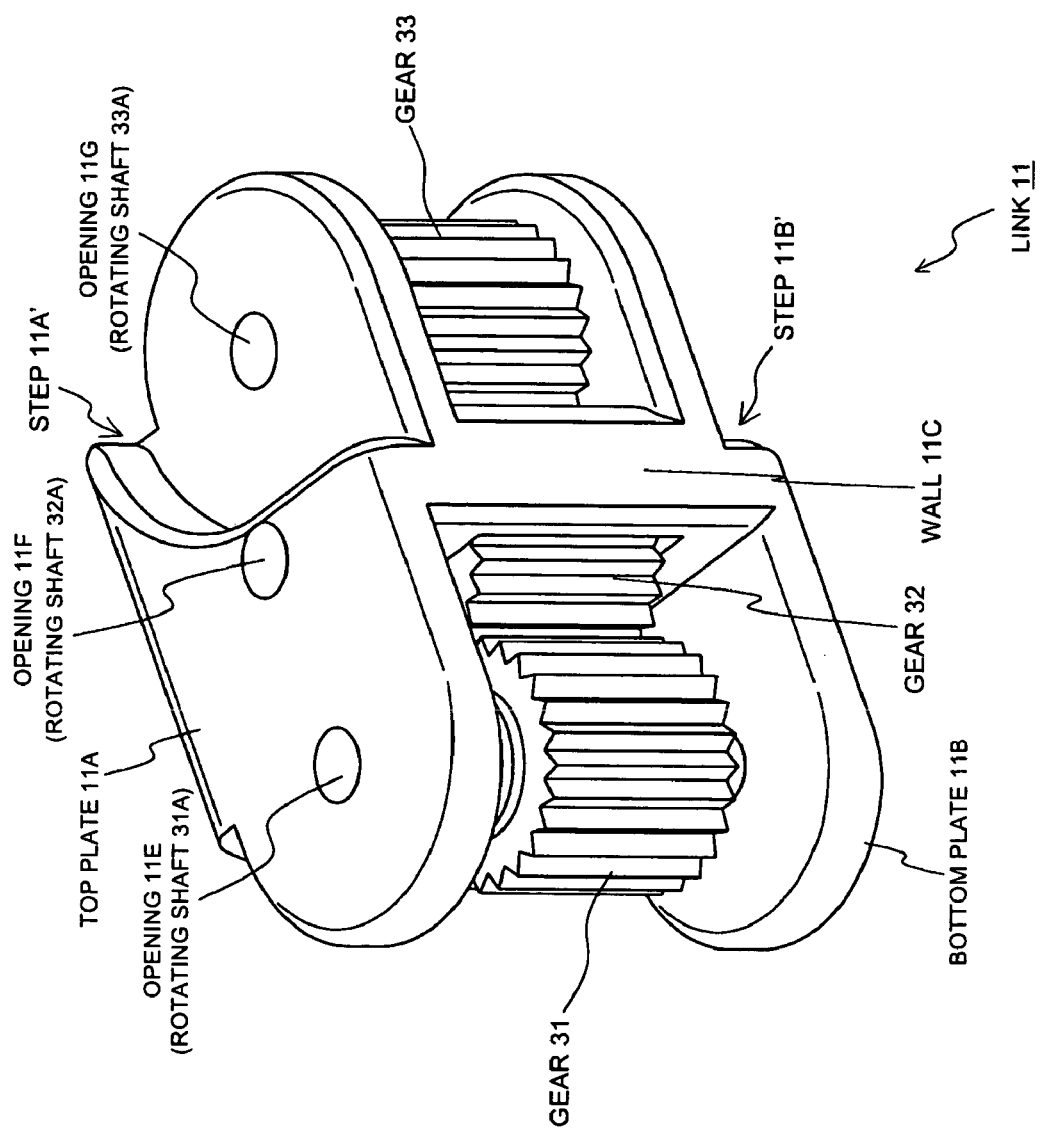
FIG. 9 is an assembly diagram of the link 11.

FIG. 7 shows the link 11 in six side views, in sectional view, and in perspective view. FIG. 8 is an exploded view of the parts of the link 11. FIG. 9 is an assembly diagram of the link 11. Although the other links 12 to 17 are not shown, it is to be understood that they have substantially the same structures as the link 11.

As shown in FIGS. 7, 8, and 9, in the link 11, a top plate 11A and a bottom plate 11B are supported substantially in parallel by walls 11C and 11D with a sufficient gap for accommodating the gears 31 to 33 being maintained between the top plate 11A and the bottom plate 11B.

Three openings 11E, 11F, and 11G and three openings 11E', 11F', and 11G', which oppose the respective openings 11E, 11F, and 11G, for inserting the rotating shafts 31A, 32A, and 33A of the respective gears 31 to 33 are formed in the top plate 11A and the bottom plate 11B, respectively.

By disposing the gears 31 to 33 in series between the top plate 11A and the bottom plate 11B, and passing the respective rotating shafts 31A, 32A, and 33A through them, they are accommodated in the space between the top plate 11A and the bottom plate 11B of the link 11 with the adjacent gears engaging each other.

The rotational force applied to the input-side gear 31 is transmitted to the adjacent gear 32 as rotational force acting in the opposite direction. This rotational force is transmitted to the output-side gear 33 adjacent the gear 32 as rotational force acting in a direction opposite to the direction of the rotational force applied to the gear 32, that is, in the same direction as the original direction. This rotational force is output to the following link 12. The number of gears accommodated inside the one link 11 is not limited to three. As long as the number of gears is an odd number of gears, a rotational force acting in the same direction as the rotational force at the input side can be output.

Steps 11A' and 11B' having about the same thicknesses as the respective top plate 11A and bottom plate 11B are formed at substantially the centers of the top plate 11A and the bottom plate 11B, respectively, so that the width of the output-side half of the link 11 is smaller than that of the input-side half of the link 11. Therefore, by inserting the output-side portions of the top plate 11A and bottom plate 11B of the link 11 into the gap between the input-side portions of a top plate 12A and a bottom plate 12B of the link 12 adjacent the link 11 (see FIGS. 10 and 11), the adjacent links 11 and 12 can be linked together.

The wall 11C protrudes from foot prints of the top plate 11A and the bottom plate 11B. In the case where the left and right edges of the wall 1C are linked to the adjacent link and the linked links are extended in a straight line, they can function as stoppers which prevent further bending at the corresponding joint by coming into contact with the edges of the wall of the other link. (This is described later.)

Figure 10:
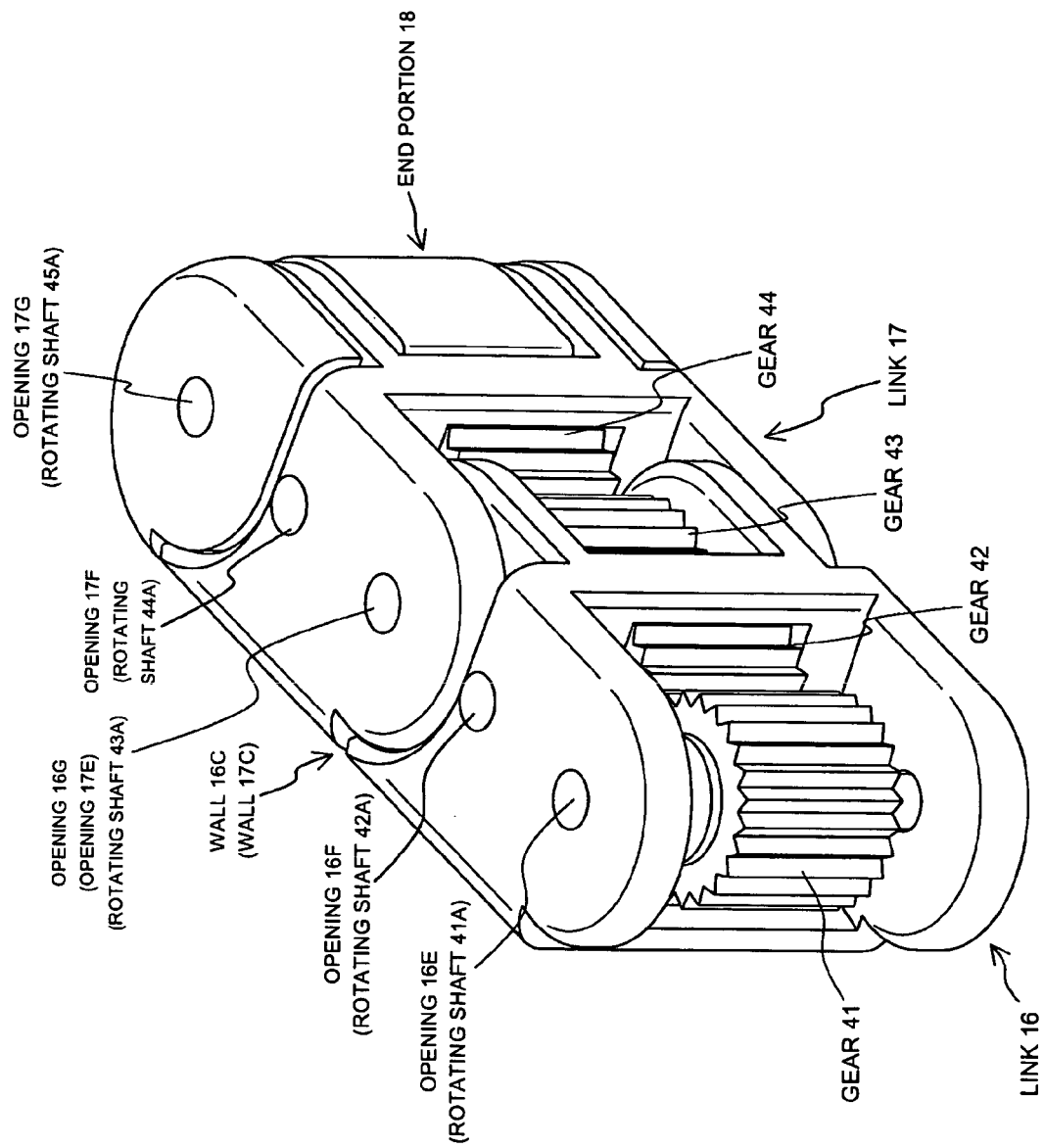
FIG. 10 shows a state in which a link 16 is linked to an adjacent link 17.
Figure 11:
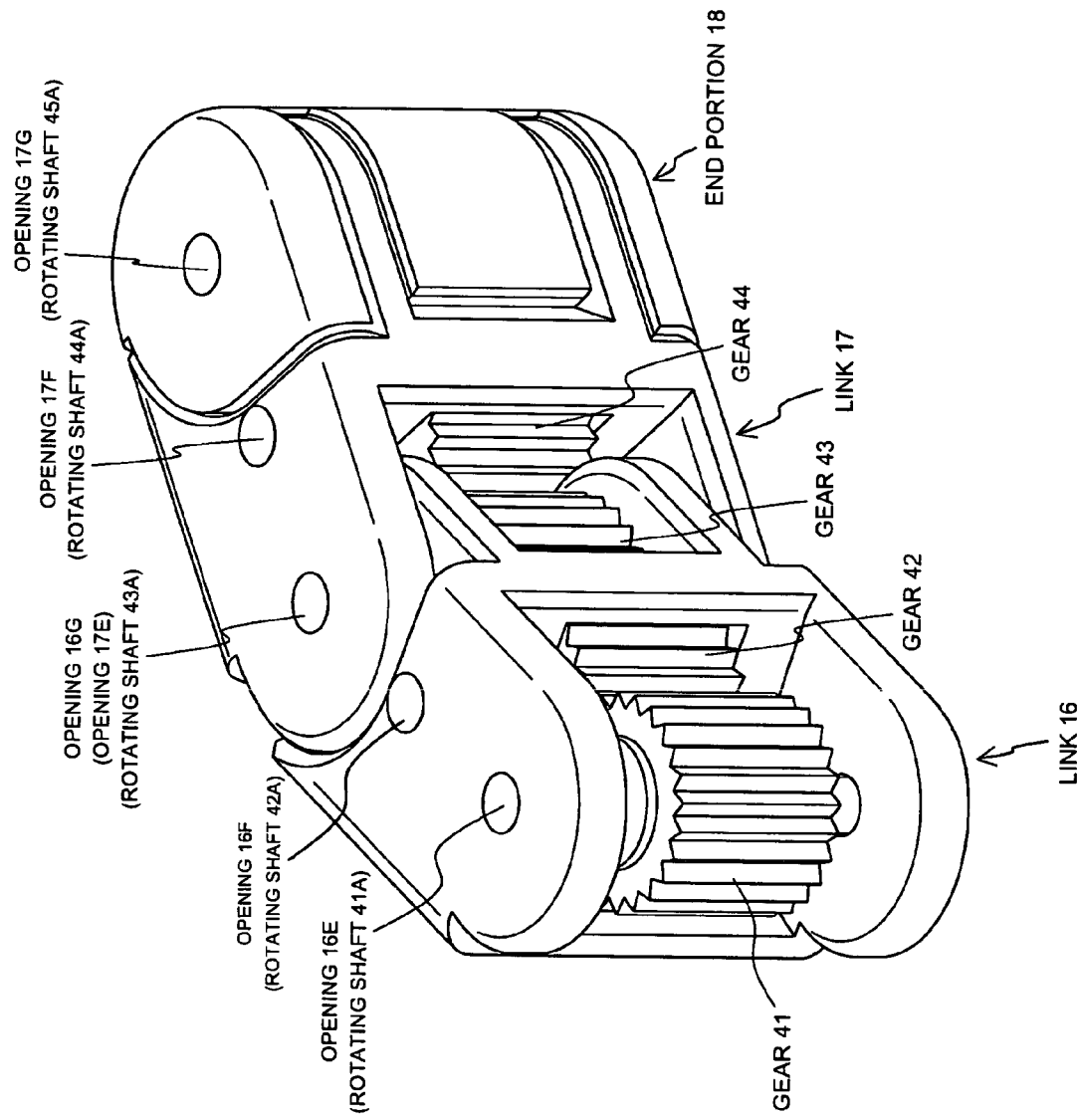
FIG. 11 shows a state in which the link 16 is linked to the adjacent link 17.
Figure 12:
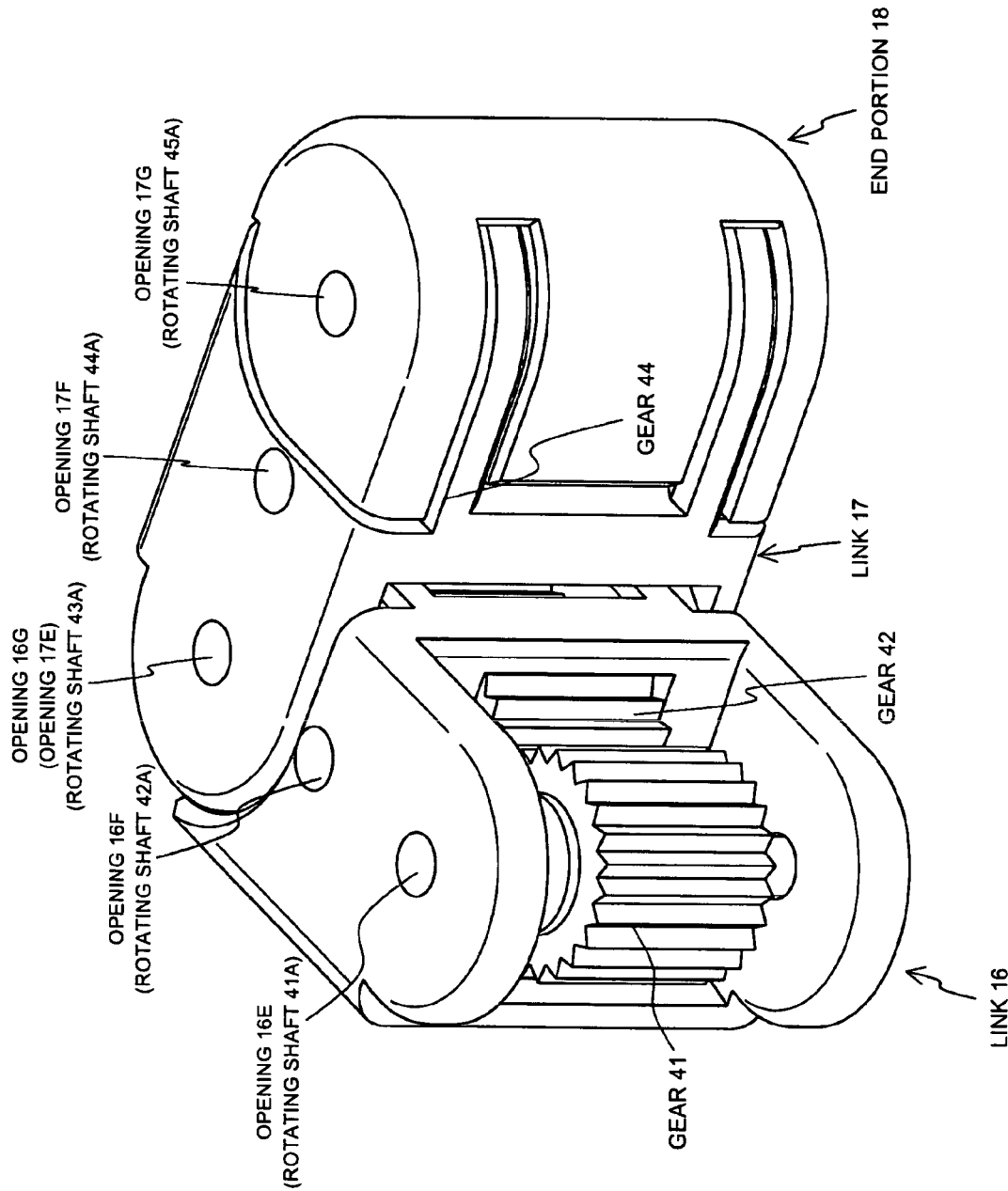
FIG. 12 shows a state in which the link 16 is linked to the adjacent link 17.

FIGS. 10 to 12 shows a state in which the link 16 is linked to the adjacent link 17. FIG. 10 shows a state in which the links 16 and 17 are extended in a straight line. FIG. 11 shows a state in which the link 17 is rotated with respect to the link 16. FIG. 12 shows a state in which the link 17 is further rotated with respect to the link 16.

As shown in FIGS. 10 to 12, the adjacent links 11 and 12 are linked so that output-side openings 16G and 16G' of the link 16 and respective input-side openings 17E and 17E' of the link 12 coincide. In such a state, the output-side gear 43 of the link 16 and the rotating shaft 43A thereof can be used as the input-side gear of the link 15 and the rotating shaft thereof, respectively. Here, the rotating shaft 43A forms the sixth joint of the articulated bending mechanism 1.

The method of assembling the adjacent links shown in FIGS. 10 to 12 are also used for assembling the other adjacent links, the links 11 and 11, the links 12 and 13, the links 13 and 14, the links 14 and 15, and the links 15 and 16.

With the adjacent links 16 and 17 being extended in a straight line in the longitudinal direction as shown in FIG. 10, clockwise rotational force is applied to the input-side gear 41 of the link 16. This rotational force is transmitted as counterclockwise rotational force to the adjacent gear 42, and is further transmitted to the output-side gear 43 as rotational force acting in the opposite direction, that is, in the clockwise direction. The gear 43 is used as the input-side gear of the link 17, and the rotating shaft 43A forms the sixth joint of the articulated bending mechanism 1. Therefore, by rotating the gear 41 clockwise, a rotational force acting in a clockwise direction in the plane of the figure is applied to the sixth joint, and, following this, the link 17 rotates clockwise with the rotating shaft 43A as the center as shown in FIG. 11.

Originally, such rotational force is similarly successively transmitted from the first joint, the second joint, the third joint, etc., so that the articulated bending mechanism 1 as a whole becomes bent as shown in FIGS. 4 to 6. By further rotating the gear 41 clockwise as shown in FIG. 12, the link 17 continues to further rotate clockwise with the rotating shaft 43A as the center.

With the adjacent links 16 and 17 being extended in a straight line in the longitudinal direction as shown in FIG. 10, the right edge of a wall 16C of the link 16 is in contact with the left edge of a wall 17C of the link 17, so that the movable angle at the sixth joint is restricted. For this reason, the articulated bending mechanism 1 can be prevented from further bending in the counterclockwise direction from its straight-line state when the link 17 tries to rotate further in the counterclockwise direction around the first joint, or the rotating shaft 43A.

Up to now, the structure of the links and the structure for connecting a link to an adjacent link have been described. By similarly linking the seven links 11 to 17 having the same structure, the articulated bending mechanism 1 of the embodiment can be formed with an elongated bending structure. In addition, as already mentioned, the end portion 18 is mounted to an end of the articulated bending mechanism 1.

Figure 13:
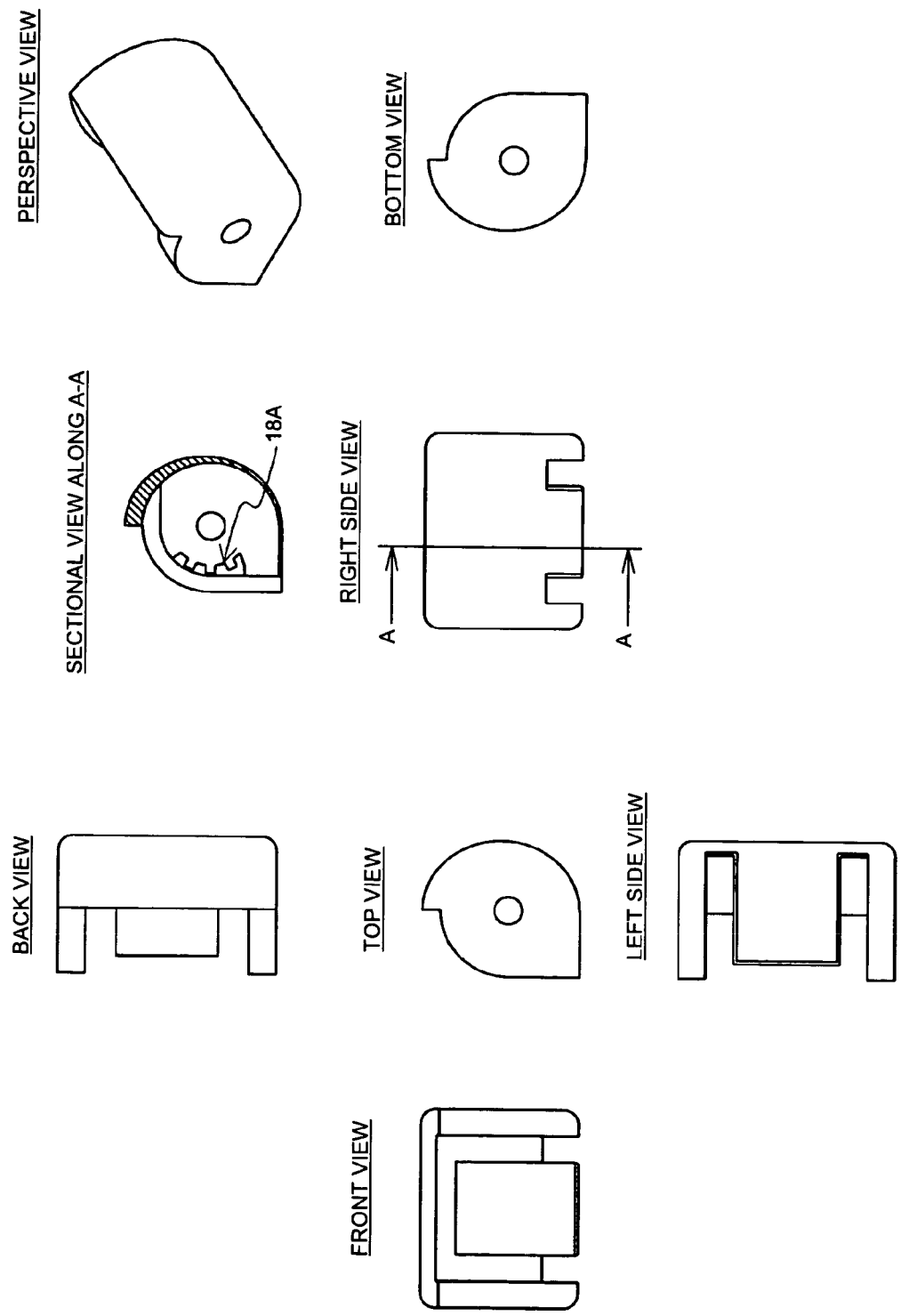
FIG. 13 shows an end portion 18 in six side views, in sectional view, and in perspective view.

FIG. 13 shows the end portion 18 in six side views, in sectional view, and in perspective view. As shown in cross section in FIG. 12, the toothed portion 18A engaging the terminal gear 45 is formed at the inner wall of the end portion 18.

The gear 45 of the link 17 can be terminated by engaging the output-side gear 45 with the toothed portion 18A of the end portion 18. FIGS. 10 to 12 also show a state in which the gear 45 is terminated by mounting the end portion 18 to the end of the link 17. By terminating the output-side gear 45, it is possible to apply the rotational force applied to the fifteen gears 31 to 45 to the links 11 to 17 without idle rotation of the gears 31 to 45 around the respective rotating shafts 31A to 45A. As a result, when the rotational force of the motor 21 is transmitted to the articulated bending mechanism 1 through the pinion 22, the worm gear 23, and the gears 24 to 27, the articulated bending mechanism 1 can be properly bent as shown in FIGS. 4 to 6 without idle rotation of the gears 31 to 45.

Next, a description of examples of application of the above-described articulated bending mechanism 1 will be given.

As already mentioned in the "Background Art," when the legged mobile robot comprises, for example, uniform movable legs that are mounted to the left and right portions of the trunk, it can do the minimum work in the living space of human beings. In order for the legged mobile robot to function and behave in a more sophisticated manner, such as holding an object or handling a particular object in a working space, or making gestures or dancing using the upper half of the body, it is desirable to install fingertips at the upper limbs or at the hands at the ends of the upper limbs. A mechanism which can bend at a plurality of joints, such as the tail that many quadrupedal animals have, the neck of a giraffe, or the nose of an elephant, is very useful in making the robot imitate the way a living being shows its feelings and emotions.

However, in general, a related articulated bending mechanism is designed and manufactured by disposing an actuator for each movable shaft. Therefore, for a member of a robot which is elongated like a finger or which has very small intervals between links connecting each joint, the mechanism becomes large and complicated.

Figure 14:
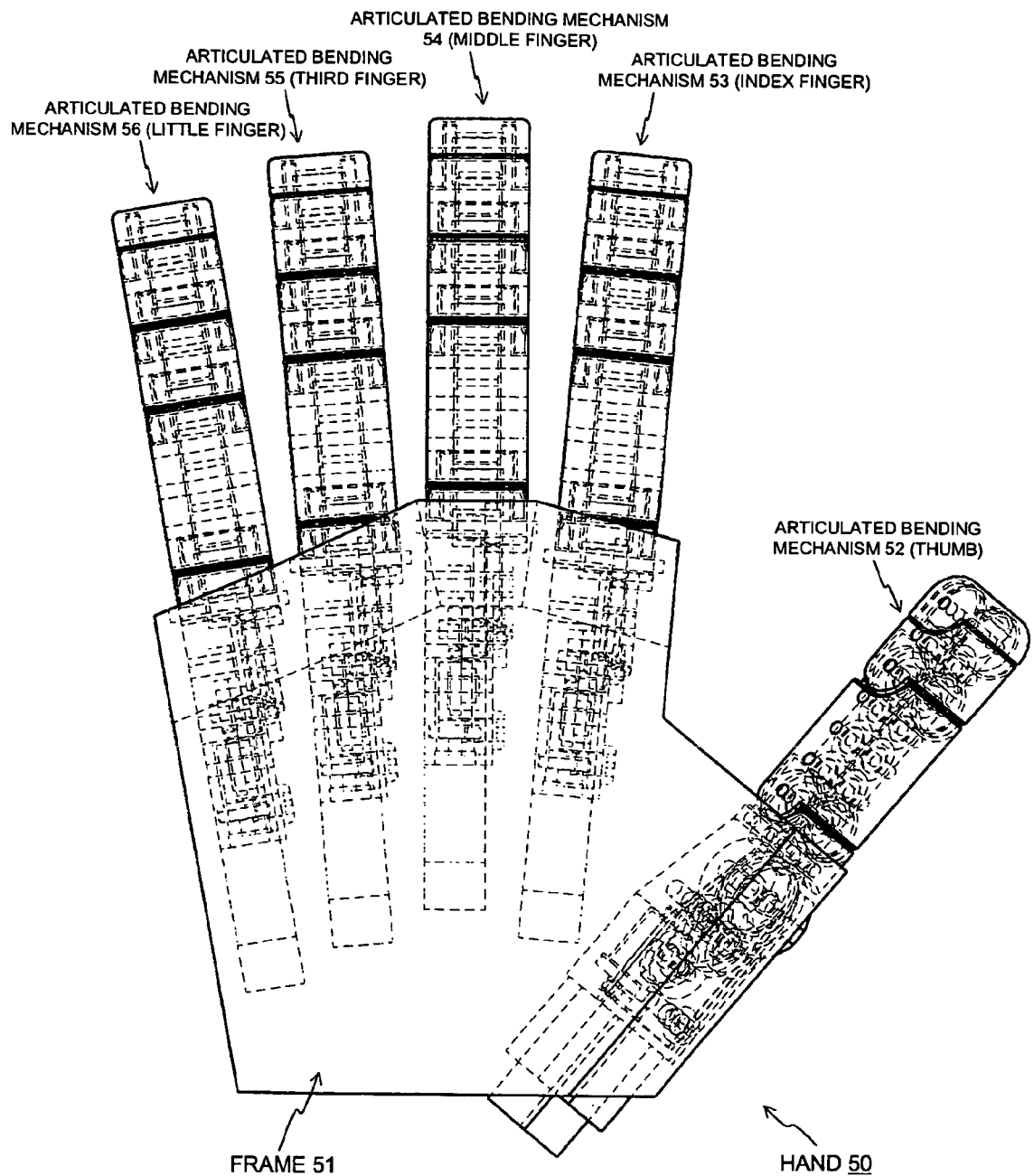
FIG. 14 shows an example in which a fist is formed using the articulated bending mechanism 1 of the embodiment as fingers.

FIG. 14 shows an example in which a fist is formed by using the articulated bending mechanism 1 of the embodiment as fingers.

As shown in FIG. 14, in a hand 50, five articulated bending mechanisms 52 to 56, forming the thumb, the index finger, the middle finger, the third finger, and the little finger, are mounted to a frame 51, forming the back of the hand. The palm side of the frame 51 is the bending direction.

It is desirable to determine the ratios between the lengths and thicknesses of the articulated bending mechanism 52 to 56 by carefully considering the purposes and functions of the thumb, index finger, middle finger, ring finger, and thumb, and the hand of an actual person.

The articulated bending mechanism 52 to 56 each comprise three links and one end portion, and have three joints. It is desirable for each bottom link forming the part of the finger to the first joint to be longer than the other links in terms of its function and the structure of the palm of the hand. In this case, by increasing the number of gears accommodated in each link from three to five, each link can be made long with the same thicknesses.

When the fingers of the hand are formed using the articulated bending mechanism 1 of the embodiment as shown in FIG. 14, it is not necessary to dispose an actuator for each movable shaft, so that members like the fingers which are elongated and which have very small intervals between links connecting each joint can be designed and manufactured with small sizes.

When a hand is formed using the articulated bending mechanism 1 of the embodiment, a large driving force is easily generated compared to the case where a bending mechanism using a wire is used. In addition, since the articulated bending mechanism 1 of the embodiment can be assembled using only inexpensive structural members, it is possible to achieve mass production.

Figure 15:
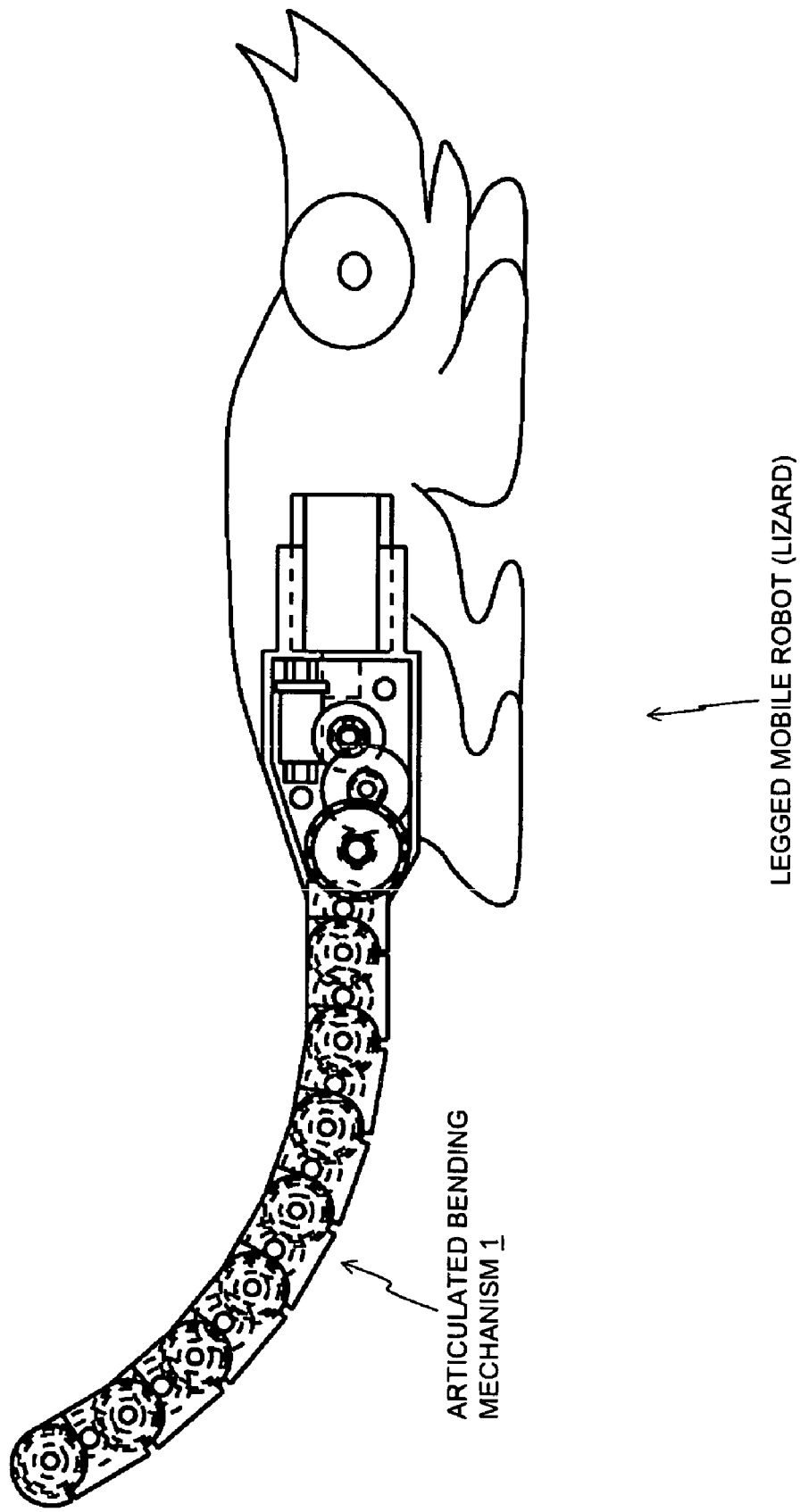
FIG. 15 shows an example in which a robot of a lizard is formed using the articulated bending mechanism 1 of the embodiment as a tail.

FIG. 15 shows an example in which a robot of a lizard is formed using the articulated bending mechanism 1 of the embodiment as a tail.

When the tail of a lizard is formed using the articulated bending mechanism 1 of the embodiment as shown in FIG. 15, it is not necessary to dispose an actuator for each movable shaft, so that a member which is elongated like the tail of a lizard and which has very small intervals between links connecting each joint can be designed and manufactured with a small size.

When the tail of a lizard is formed using the articulated bending mechanism 1 of the embodiment, a large driving force is easily generated compared to the case where a bending mechanism using a wire is used. In addition, since the articulated bending mechanism 1 of the embodiment can be assembled using only inexpensive structural members, it is possible to achieve mass production.

Figure 16:
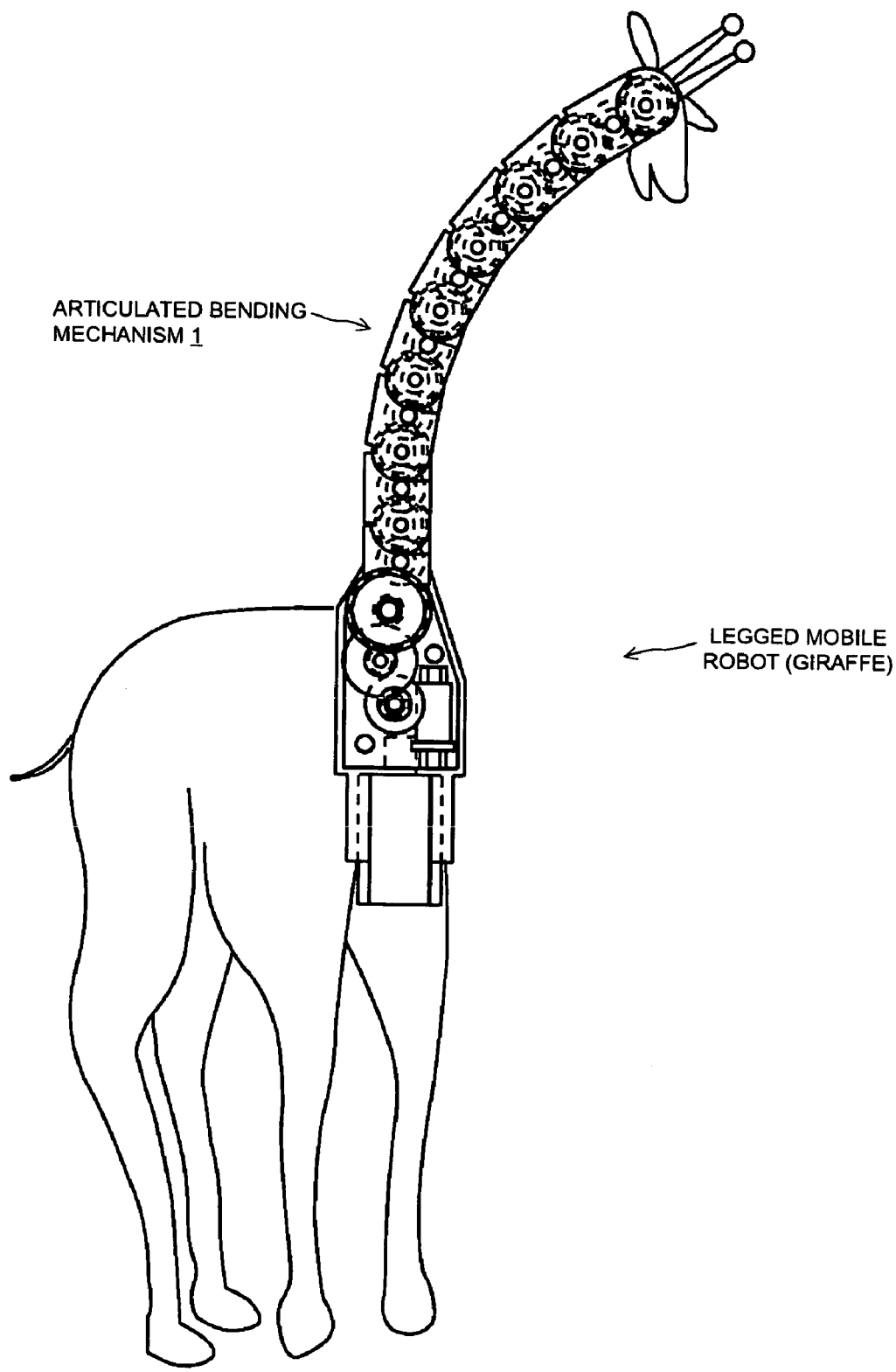
FIG. 16 shows an example in which a robot of a giraffe is formed using the articulated bending mechanism 1 of the embodiment as a neck.

FIG. 16 shows an example in which a robot of a giraffe is formed using the articulated bending mechanism 1 of the embodiment as a neck.

When the neck of a giraffe is formed using the articulated bending mechanism 1 of the embodiment as shown in FIG. 16, it is not necessary to dispose an actuator for each movable shaft, so that a member which is elongated like the neck of a giraffe and which has very small intervals between links connecting each joint can be designed and manufactured with a small size.

When the neck of a giraffe is formed using the articulated bending mechanism 1 of the embodiment, a large driving force is easily generated compared to the case where a bending mechanism using a wire is used. In addition, since the articulated bending mechanism 1 of the embodiment can be assembled using only inexpensive structural members, it is possible to achieve mass production.

Figure 17:
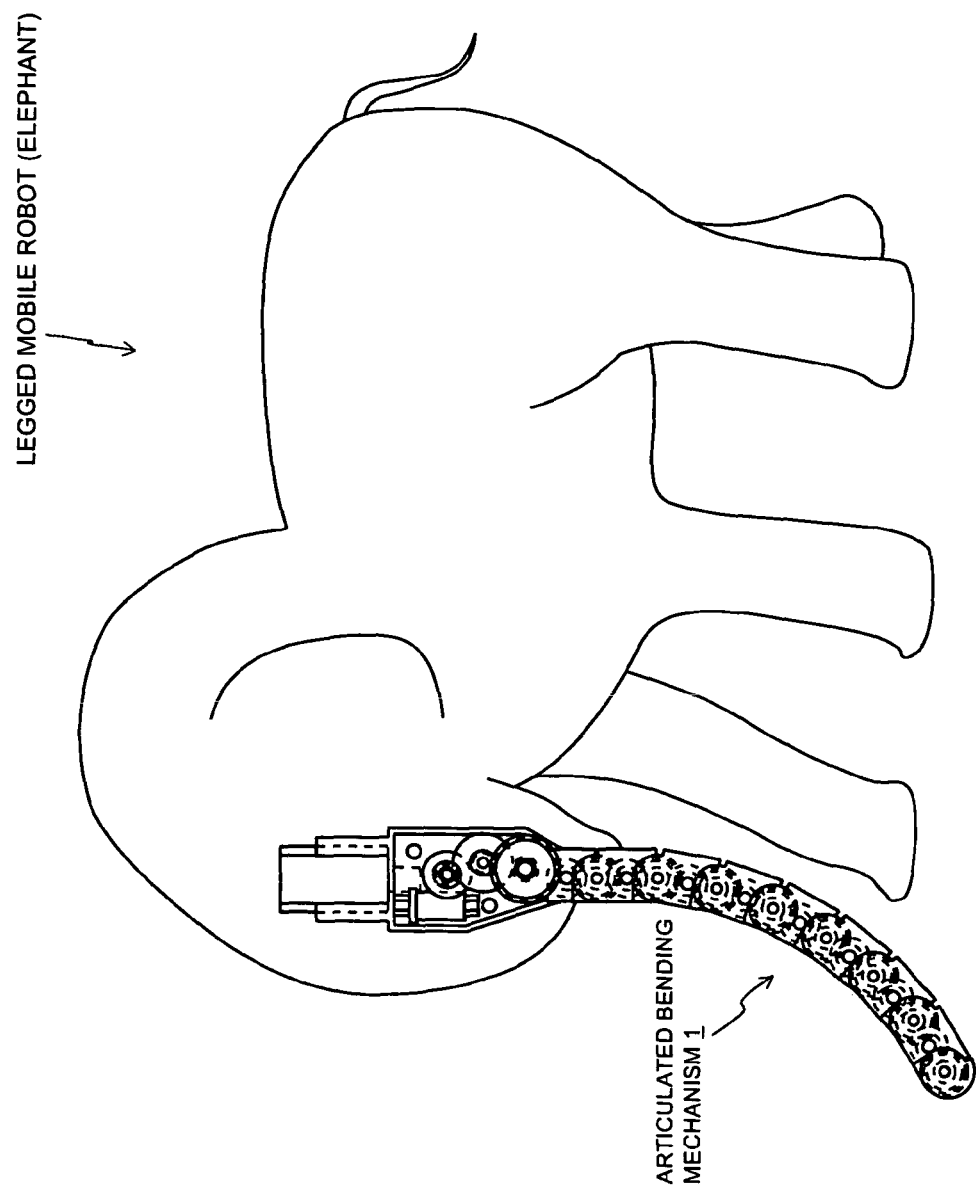
FIG. 17 shows an example in which a robot of an elephant is formed using the articulated bending mechanism 1 of the embodiment as a nose.

FIG. 17 shows an example in which a robot of an elephant is formed using the articulated bending mechanism 1 of the embodiment as a nose.

When the nose of an elephant is formed using the articulated bending mechanism 1 of the embodiment as shown in FIG. 17, it is not necessary to dispose an actuator for each movable shaft, so that a member which is elongated like the nose of an elephant and which has very small intervals between links connecting each joint can be designed and manufactured with a small size.

When the nose of an elephant is formed using the articulated bending mechanism 1 of the embodiment, a large driving force is easily generated compared to the case where a bending mechanism using a wire is used. In addition, since the articulated bending mechanism 1 of the embodiment can be assembled using only inexpensive structural members, it is possible to achieve mass production.

Supplement

The present invention has been described in detail with reference to a particular embodiment. However, it is apparent that various modifications and substitutions may be made by those skilled in the art within a scope not departing from the gist of the present invention.

The gist of the present invention is not necessarily limited to a product called a "robot." More specifically, as long as the device is a mechanical device which moves like a human being by making use of electrical and magnetic actions, the present invention may be similarly applied to products of other industrial fields, such as toys.

The point is that the present invention has been disclosed with reference to illustrative forms thereof, so that the description of the specification is not to be construed in a restrictive sense. In order to determine the gist of the present invention, one should refer to the claims.

INDUSTRIAL APPLICABILITY

The present invention makes it possible to provide an excellent legged mobile robot comprising a bending portion that is formed by a plurality of joints, such as fingers, a tail, a neck, or a nose; and an articulated bending mechanism thereof.

The present invention also makes it possible to provide an excellent legged mobile robot whose articulated bending mechanism is small and low in cost and which can be used to imitate the way a living being shows its emotions and feelings; and the articulated bending mechanism.

According to the present invention, since the number of actuators used in bending and driving at the plurality of joints is reduced, the robot can be formed with a small size and at a low cost. Therefore, the present invention can contribute to reducing the cost and size of a device comprising this type of articulated bending mechanism.

The invention claimed is:

1. An articulated bending mechanism comprising:
a plurality of connected links that rotatably support a plurality of gears including input-side gears and output-side gears by engaging the gears,
wherein the output-side gear of one link and the input-side gear of an adjacent link are used in common, and
wherein a rotating shaft of the common gear provides a degree of freedom provided at a joint of the articulated bending mechanism.

2. The articulated bending mechanism according to claim 1, wherein each link rotatably supports an odd number of gears by engaging the gears, and an output-end gear rotates in the same direction as an input-end gear.

3. The articulated bending mechanism according to claim 1, further comprising a drive section to apply rotational force to the input-side gear at a bottommost link, wherein, as the rotational force is applied by the drive section, bending occurs at a joint between each link in a certain direction.

4. The articulated bending mechanism according to claim 1, which is used as fingers of a robot.

5. The articulated bending mechanism according to claim 4, wherein the sizes of the links or the distances between joints of the fingers are adjusted according to the number of gears accommodated in each link.

6. The articulated bending mechanism according to claim 1, which is used as a neck of a robot.

7. The articulated bending mechanism according to claim 1, which is used as a nose of a robot.

8. The articulated bending mechanism according to claim 1, which is used as a tail of a robot.

9. An articulated bending mechanism comprising:
a plurality of connectable links that rotatably support a plurality of gears including input-side gears and output-side gears by engaging the gears; and
a drive section to apply rotational force to the input-side gear at a bottommost link,
wherein, as the rotational force is applied by the drive section, bending occurs at a joint between each link in a certain direction,
wherein the drive section has a clutch mechanism to allow the input-side gear of the bottommost link to rotate freely by disengaging the rotating shaft when a rotational opposing force equal to or greater than a predetermined value is applied to the drive section from the input-side gear of the bottommost link.

10. An articulated bending mechanism comprising:
a plurality of connectable links that rotatably support a plurality of gears including input-side gears and output-side gears by engaging the gears; and
an end portion which engages the output-side gear of the link at a frontmost end in order to prevent idle rotation of the gears supported by the respective links, so that bending at a joint between each link in a certain direction as each gear rotates is ensured.

11. An articulated bending mechanism comprising:
a plurality of connectable links that rotatably support a plurality of gears including input-side gears and output-side gears by engaging the gears,
wherein each link has a restricting section which, to prevent rotation in a reverse direction at a joint between adjacent links, comes into contact with its adjacent link in a predetermined rotating position at the joint to restrict rotation.

12. A robot comprising:
a robot frame; and
an articulated bending mechanism supported by the robot frame,
wherein the articulated bending mechanism is formed by connecting links which rotatably support a plurality of gears including input-side gears and output-side gears by engaging the gears, and
wherein, in the articulated bending mechanism, the output-side gear of one link and the input-side gear of an adjacent link are used in common and a rotating shaft of the common gear provides a degree of freedom provided at a joint.

13. The robot according to claim 12, wherein each link of the articulated bending mechanism rotatably supports an odd number of gears by engaging the gears, and an output-end gear rotates in the same direction as an input-end gear.

14. The robot according to claim 12, wherein the articulated bending mechanism further comprises a drive section to apply rotational force to the input-side gear at a bottommost link, and wherein, as the rotational force is applied by the drive section, bending occurs at a joint between each link.

15. The robot according to claim 12, wherein the articulated bending mechanism is used as fingers.

16. The robot according to claim 15, wherein the sizes of the links or the distances between joints of the fingers are adjusted according to the number of gears accommodated in each link.

17. The robot according to claim 12, wherein the articulated bending mechanism is used as a neck.

18. The robot according to claim 12, wherein the articulated bending mechanism is used as a nose.

19. The robot according to claim 12, wherein the articulated bending mechanism is used as a tail.

20. A robot comprising:
a robot frame; and
an articulated bending mechanism supported by the robot frame,
wherein the articulated bending mechanism is formed by connecting links which rotatably support a plurality of gears including input-side gears and output-side gears by engaging the gears, and
wherein the drive section has a clutch mechanism to allow the input-side gear of the bottommost link to rotate freely by disengaging the rotating shaft when a rotational opposing force equal to or greater than a predetermined value is applied to the drive section from the input-side gear of the bottommost link.

21. A robot comprising:

a robot frame; and an articulated bending mechanism supported by the robot frame, wherein the articulated bending mechanism is formed by connecting links which rotatably support a plurality of gears including input-side gears and output-side gears by engaging the gears, and wherein the articulated bending mechanism further comprises an end portion which engages the output-side gear of the link at a frontmost end in order to prevent idle rotation of the gears supported by the respective links, so that bending at a joint between each link in a certain direction as each gear rotates is ensured.

22. A robot comprising:

a robot frame; and an articulated bending mechanism supported by the robot frame, wherein the articulated bending mechanism is formed by connecting links which rotatably support a plurality of gears including input-side gears and output-side gears by engaging the gears, and wherein each link of the articulated bending mechanism has a restricting section which, in order to prevent rotation in a reverse direction at a joint between adjacent links, comes into contact with its adjacent link in a predetermined rotating position at the joint to restrict rotation.

* * * * *